Feb. 5, 1952     N. KOPPEL     2,584,716
NONDRIP VALVE
Filed Dec. 15, 1947
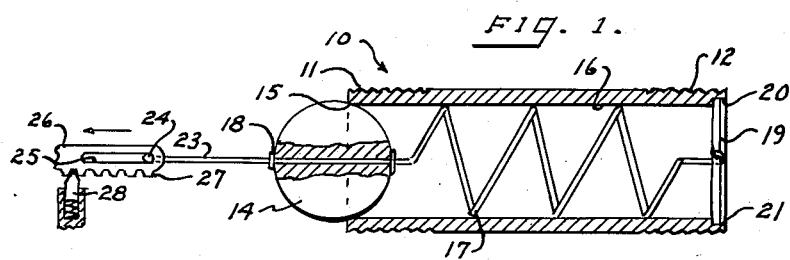
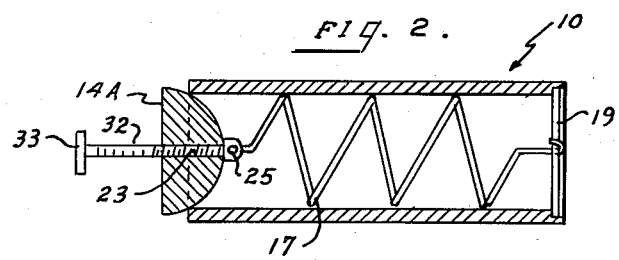
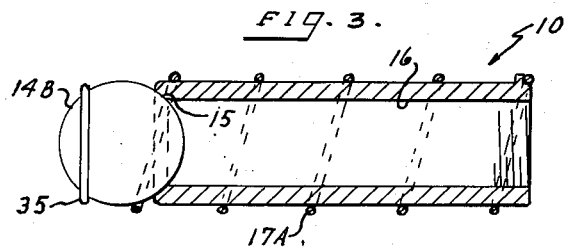
INVENTOR.
NOAH KOPPEL
BY Howard J. Jeandron
ATTORNEY Patented Feb. 5, 1952

2,584,716

UNITED STATES PATENT OFFICE 2,584,716

NONDRIP VALVE

Noah Koppel, Bronx, N. Y.

Application December 15, 1947, Serial No. 791,919

1 Claim. (Cl. 251—164)

This invention relates to valve construction and more particularly to a valve that may be inserted in a fluid device wherein it permits fluid to flow under pressure in one direction but prevents the leakage of said fluid when the pressure has been cut off thus producing a non-drip valve.

An object of this invention is to provide a valve of simple, unique construction that may be inserted within a normal fluid line.

Another object of this invention is to provide a fluid valve that permits fluid flow under a pre-determined pressure but prevents leakage of said fluid when the pressure has been cut off.

A still further object of this invention is to provide a poppet valve construction in which the valve is retained on its valve seat by a pre-determined resilient force and in which fluid pressure on said valve greater than said resilient force will permit the fluid to flow past the said valve.

A further object of this invention is to provide a valve construction in which the resilient force retaining said valve closed may be quickly and easily adjusted to thus permit said valve to be opened by any pre-determined fluid pressure within a reasonable range of pressures and in which said valve will close to prevent leakage of said fluid when the pressure is reduced or cut off.

A still further object of this invention is to provide a valve construction in which the resilient force retaining said valve closed may be adjusted to an exact tension to provide means to pass fluid at a given pressure.

A further object of this invention is to provide a valve that is retained closed by a predetermined resilient force but may be quickly and easily dumped or opened.

A further object of this invention is to provide a dual purpose valve that normally prevents leakage, that relieves fluid pressure, that may be quickly and easily dumped and in which means are provided to lock said valve closed.

Other objects of this invention shall be apparent by reference to the accompanying description and drawing in which Fig. 1 illustrates a cross-sectional view of the valve, Fig. 2 illustrates a cross-sectional view of another embodiment of the valve, and Fig. 3 illustrates a cross-sectional view of a still further embodiment.

Referring to Fig. 1 there is illustrated a valve body 10, which may be a short section of pipe or a common nipple connection as utilized in ordinary plumbing or steam fitting connections with a nipple arrangement, there are external threads 11 and 12 provided at either end thereof. A poppet valve 14 which has been illustrated as a ball-type poppet will be mounted on a valve seat 15 which is the leading edge of the nipple at the periphery of the internal bore 16. A spring 17 is mounted within the bore 16 having one end 18 thereof affixed to the poppet 14 in any suitable fashion. In this figure we have shown the end 18 as passing through the poppet 14 and secured at the opposite end of the poppet valve 14. An extension 23 is provided having its end 24 mounted in a slot 25 of a dump lever 26. The lever 26 is also provided with a rack 27 that is engaged by a locking detent 28. The opposite end of the spring 17 is attached to a cross member 19, the cross member 19 is mounted in two slots 20 and 21 at the outer periphery of the member 10, thus with a spring 17 of predetermined tensional strength we may calculate the fluid pressure that may be utilized to open valve 14 and permit a fluid flow and we may likewise calculate the minimum pressure at which valve 14 will close and prevent the passage of fluid. In addition we may quickly and easily open valve 14 to dump the fluid in bore 16, by moving lever 26 in the direction of the arrow as indicated. However, this valve is normally in conjunction with other cut-off devices or valves, this valve is utilized only to prevent leakage that may pass the normal regular valve or cut-off valve, to thus prevent such leakage from dripping and passing valve 14. The valve may also be locked in a closed or open position by means of the detent 28 and the pinion rack 27. The lever 26 is provided with a slot 25 so that during the normal operation of the valve 14 it may move freely and the end 24 of rod 23 will slide in this slot.

Referring to Fig. 2 we have illustrated a similar valve arrangement with a body 10 and spring 17 and cross member 19 but in this embodiment we have substituted a valve 14A which has been shown as a half-sphere with a threaded opening 23. We have inserted a threaded bolt 24 in this threaded opening. The bolt 24 is provided with an aperture 25 through which the end of spring 17 may be mounted. The bolt 24 at its opposite end is provided with a long graduated shank 32 and a T-shaped handle 33. The end 25 may be swiveled so that it will not turn the spring 17 when the bolt 32 is adjusted. Thus the valve illustrated in Fig. 2 may function similar to that illustrated in Fig. 1 but in addition it is possible to adjust valve 14A to vary the tension of spring 17 and by means of the graduate shank 32 we may set the valve to open to an exact predetermined fluid pressure. This is performed by turning the T-shaped handle 33 thus causing the threaded member 23 to be moved into or out of the valve 14A until the graduated scale indicates the pressure setting at the face of the valve 14A.

A further embodiment of this valve is illustrated in Fig. 3. When the valve is used for fluids of heavy viscosity we are likely to find that such heavy tar like fluids cause the valve to open before the fluid has exerted any pressure on the valve proper. This is due to the effect of the fluid on the spring, thus to eliminate this defect a spring 17A is mounted externally and attached to one end of the body 10. A ball poppet is similarly mounted at the opposite end of the body 10 to act against the valve seat 15. The spring 17A is passed over the ball 14B and the spring 17A is provided with a ring end 35 of smaller diameter than the cross-sectional area of the ball 14B. Thus the fluid may flow freely through the bore 16 and will act on the face of the ball 14B, while spring 17A will retain the ball valve 14B on its seat 15 until the fluid pressure overcomes the force of spring 17A. The valve will operate similar to the above described valve to close and prevent leakage when the fluid pressure is cut off.

Although we have illustrated a poppet valve arrangement it is apparent that any type valve may be utilized to perform the same function as illustrated in this invention and although we have shown a valve body 10 similar to a nipple arrangement the body 10 might also be made as an insert to be inserted within any fluid line or member to perform similar functions. One of the embodiments to which this device is intended to be used in conjunction with is an oil burner wherein the pump develops a fluid pressure during operation and the fluid will normally pass the valve 14, but when said burner stops there may be a certain amount of fluid leakage through said pump but said leakage does not develop sufficient pressure to pass valve 14, thus the burner is protected and the oil will not leak to cause a surplus in the burner end when the burner starts. Another type of installation intended for this valve may be for an ordinary faucet. Most of the valves used in conjunction with the faucets become leaky with use. Therefore, this non-drip valve may be inserted at the outlet end of the faucet and thus prevent the usual drip. Other uses for the valve are quite apparent, the valve shown in Fig. 2 is adaptable to many uses where an exact measured pressure is to be passed, or where the pressure must be regulated and changed.

Various changes and modifications may be made to this device without departing from the spirit of this invention and this invention shall be limited only by the appended claim.

What is claimed is:

A non-drip valve that may be inserted within a pipe including a hollow body portion having two openings, a poppet valve mounted to abut against the exterior of one opening, a spring mounted within said body, said spring affixed to one end of said body portion and the opposite end of said spring affixed to the poppet valve, a rod attached to said poppet valve in alignment with said poppet and said spring and mounted externally of the valve body, said body portion being threaded externally, an operator connected to said rod through a lost-motion device, a detent means on said lost-motion device, said lost-motion connection and detent means holding the operator in a set position to prevent full closure of the valve, the lost-motion connection permitting the fluid to move the valve to a more fully open position.

NOAH KOPPEL.

REFERENCES CITED

The following references are of record in the file of this patent:

UNITED STATES PATENTS

| Number | Name | Date |
|---|---|---|
| 295,676 | Ross | Mar. 25, 1884 |
| 1,522,809 | Collins | Jan. 13, 1925 |
| 1,548,512 | Costello | Aug. 4, 1925 |
| 1,957,736 | Strehler | May 8, 1934 |
| 2,035,438 | Warren | Mar. 24, 1936 |

FOREIGN PATENTS

| Number | Country | Date |
|---|---|---|
| 14,523 | Denmark | of 1911 |
| 19,931 | Great Britain | of 1906 |